United States Patent [19]
Watanabe et al.

[11] Patent Number: 5,109,903
[45] Date of Patent: May 5, 1992

[54] PNEUMATIC TIRE HAVING CHAMFERED TREAD BLOCKS

[75] Inventors: Susumu Watanabe; Kiyoshi Tomioka, both of Hiratsuka, Japan

[73] Assignee: Yokohama Rubber Co. Ltd., Japan

[21] Appl. No.: 503,594

[22] Filed: Apr. 3, 1990

[30] Foreign Application Priority Data

Apr. 13, 1989 [JP] Japan .................................. 1-91872

[51] Int. Cl.⁵ .............................................. B60C 11/11
[52] U.S. Cl. .................................................. 152/209 R
[58] Field of Search ............ 152/209 R, 209 D, 209 B, 152/209 A

[56] References Cited

U.S. PATENT DOCUMENTS

| | | | |
|---|---|---|---|
| 3,000,421 | 9/1961 | Hack et al. | 152/209 R |
| 3,543,827 | 12/1970 | Roberts et al. | 152/209 R |
| 4,690,189 | 9/1987 | Bradisse et al. | 152/209 R |
| 4,915,150 | 4/1990 | Takusagawa et al. | 152/209 R |

FOREIGN PATENT DOCUMENTS

| | | | |
|---|---|---|---|
| 214669 | 1/1958 | Australia | 152/209 B |
| 62-181904 | 8/1987 | Japan . | |
| 22601 | 1/1989 | Japan | 152/209 D |

*Primary Examiner*—Geoffrey L. Knable

[57] ABSTRACT

Pneumatic tire characterized in the edge of each block formed on a tire tread surface is chamfered to a curve surface connecting to the tread surface in a curve form.

3 Claims, 5 Drawing Sheets

PNEUMATIC TIRE HAVING CHAMFERED TREAD BLOCKS

BACKGROUND OF THE INVENTION

This invention relates to a pneumatic tire which reduces non-uniform wear of a tire tread surface and noise at the time of running, and more particularly to a pneumatic tire for a passenger car.

In tires in general which have a tread pattern consisting of blocks on a tire tread surface (or those tires which have so-called "block-based pattern"), if the angle between two adjacent sides of a block tread surface forming the edge of the block is an acute angle when viewed on a plane, the edge portion has lower rigidity than other portions inside the block so that a contact pressure at the time of running is lower than that of other portions inside the block. Accordingly, wear is more greatly retarded at this edge portion than at other portions and non-uniform wear thus takes place on the block tread surface. Since this edge portion has lower rigidity than other portions inside the block, the edge portion vibrates during running and a high frequency noise is generated from this edge portion.

In order to cope with the problem described above, it has been a customary practice to make chamfering in such a manner as to cut obliquely the edge portion of the block (e.g. Japanese Patent Laid-Open No. 181904/1987). According to this structure, however, an angular ridge occurs at the boundary between the block tread surface and the chamfer surface and hence, it is difficult to sufficiently suppress the occurrence of non-uniform wear and the high frequency noise. If chamfering is drastically made, the appearance of the tread pattern is deteriorated.

SUMMARY OF THE INVENTION

It is an object of the present invention to provide a pneumatic tire which has a tread pattern consisting of blocks on a tire tread surface and which reduces non-uniform wear and noise at the time of running.

To accomplish the object described above, in a tire having a tread pattern consisting of blocks divided by main grooves disposed on a tire tread surface in a tire circumferential direction and by sub-grooves disposed in a tire transverse direction, the pneumatic tire in accordance with the present invention is characterized in that the edge of each block formed by the main groove and the sub-groove crossing each other is chamfered to a curve surface connecting to the block tread surface in a curve form.

Here, the term "edge" represents a corner portion which is encompassed by two adjacent side surfaces of each block and the block tread surface.

DETAILED DESCRIPTION OF THE PREFERRED EMBODIMENTS

Figure 1:
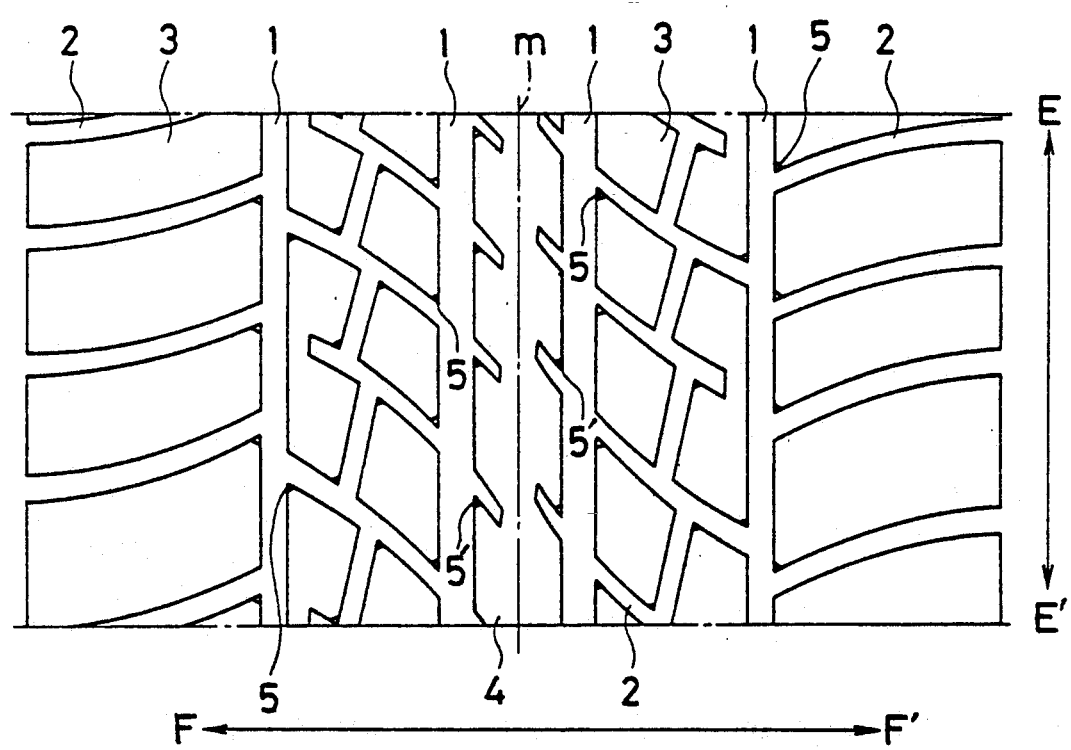
FIG. 1 is an explanatory plan view showing an example of a tread pattern formed on a tread surface of a pneumatic tire in accordance with the present invention.

In FIG. 1, each main groove 1 is disposed on the tire tread surface in the tire circumferential direction EE' and each sub-groove 2 is disposed in the tire transverse direction FF'. The main grooves 1 and the sub-groove 2 define blocks 3 between them. Reference numeral 4 represents a rib and symbol m represents a tire equator line.

Figure 2A:
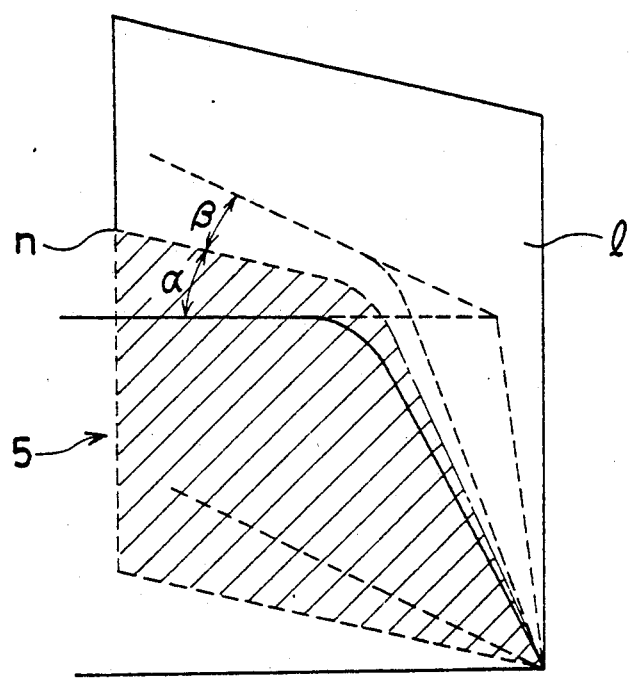
FIG. 2(A) is an explanatory perspective view showing in enlargement the edge of a block.
Figure 2B:
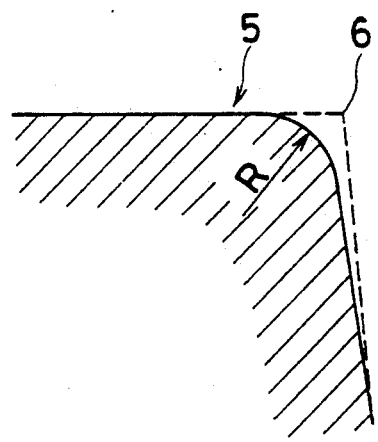
FIG. 2(B) is an explanatory sectional view of the edge of the block.

In FIG. 1, among the edges defined by mutually crossing main grooves 1 and sub-grooves 2, an edge 5 whose angle between the adjacent two sides on the tread surface forming the edges is acute on a plan view is chamfered to a curve surface connecting to the block tread surface in a curve form. In other words, chamfering is made roundly and smoothly so as not to form a ridge line at the boundary with the block tread surface at the edge 5 of each block 3. To make chamfering with such a curve surface, the corner 6 of the edge 5 is preferably cut off with a radius of curvature R of at least 1 mm and preferably from 2 mm to 15 mm as shown in FIG. 2 on the section 1 which is vertical to the block tread surface and passes through a substantial center line n (or a bisector; $\alpha = \beta$ angle) between the adjacent two sides of the block tread surface forming the edge 5 as shown in FIG. 2(A). If the radius of curvature R is less than 1 mm, the effect of chamfering is not observed substantially and the corner 6 gets square or angular. Incidentally, in the block-based pattern with the rib 4 such as shown in FIG. 1, the edge 5' of the rib 4, too, is chamfered preferably to the curve surface connecting to the tread surface in a curve form in the same way as the edge 5 of the block 3.

Figure 3A:
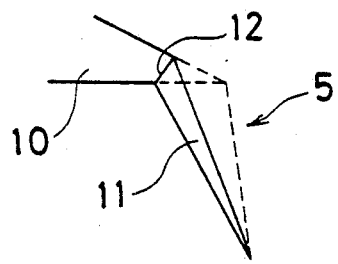
FIG. 3(A) is an explanatory view showing the edge of a chamfered block in a conventional pneumatic tire.
Figure 3B:
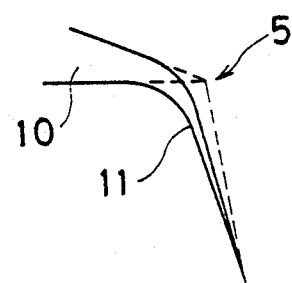
FIG. 3(B) is an explanatory view showing the edge of the block which is chamfered to a curve surface connecting to the tread surface of the tire in the curve form in accordance with the present invention.

When the edge of the block of the conventional pneumatic tire is chamfered, an angular ridge 12 occurs at the boundary between the block tread surface 10 and the chamfer surface 11 as shown in FIG. 3(A). In contrast, when the edge 5 of the block 3 is chamfered to the curve surface connecting to the tread surface in the curve form as in the present invention, the block tread surface 10 and the chamfer surface 11 connect to each other roundly and continuously as shown in FIG. 3(B). Accordingly, since rigidity of the edge 5 does not drop more greatly than the conventional chamfering, the present invention can reduce non-uniform wear and noise at the time of running.

In the edge of the block to be chamfered in the present invention, the angle between the adjacent two sides of the block tread surface forming the edge may be acute or obtuse or both when viewed on the plane, but is preferably acute on the plane in order to sufficiently suppress the occurrence of non-uniform wear and high frequency noise.

Next, an embodiment of the present invention will be given.

EMBODIMENT

Non-uniform wear and noise at the time of running (sound pressure level) were evaluated for the conventional tire and the tire of the present invention having the following specifications, respectively.

(1) Conventional tire

Tire size 206/60 R15 89H, with a tread pattern such as shown in FIG. 1.

Figure 4A:
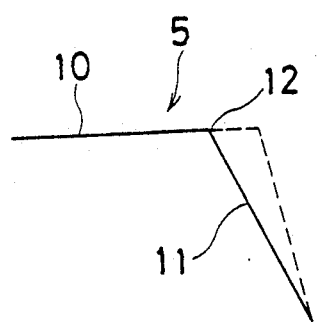
FIG. 4(A) is an explanatory side view of the block in a conventional new pneumatic tire.

The angular ridge 12 existed at the boundary between the block tread surface 10 and the chamfer surface 11 at the edge 5 of the block 3 of the new tire as shown in FIG. 4(A).

(2) Tire of this invention

Tire size: 205/60 R15 89H, with a tread pattern such as shown in FIG. 1.

Figure 5A:
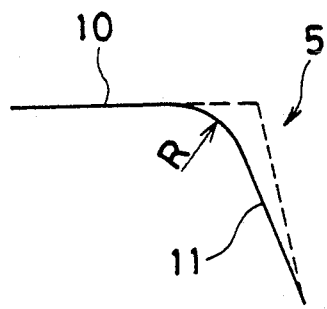
FIG. 5(A) is an explanatory side view of the block in a new pneumatic tire of the present invention.

The block tread surface 10 and the chamfer surface 11 are connected to each other roundly and continuously at the edge 5 of the block 3 of the new tire as shown in FIG. 5(A). The radius of curvature R was 2.5 mm.

EVALUATION METHOD OF NON-UNIFORM WEAR

The tires of the present invention and the conventional tires were fitted to the front wheels of an FR (front-engine rear wheel drive) car of a domestic make, respectively, and non-uniform wear of tires after running 4,000 km at a mean speed of 30 km/h on an ordinary road was visually judged (five-point evaluation).

Tires having a greater evaluation point had more excellent non-uniform wear resistance and the occurrence of non-uniform wear was less.

Figure 4B:
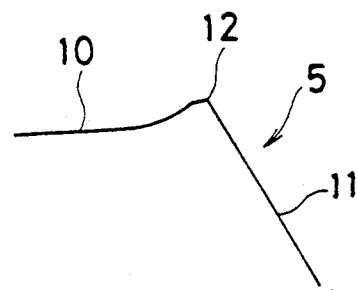
FIG. 4(B) is an explanatory side view of the block of the conventional pneumatic tire at the time of wear.
Figure 5B:
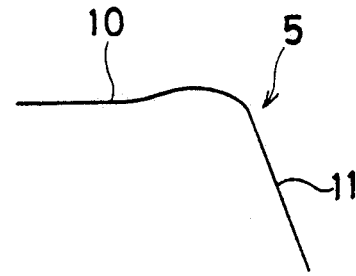
FIG. 5(B) is an explanatory side view of the block in the pneumatic tire of the present invention at the time of wear.

FIG. 4(B) shows the sectional shape of the edge of the block at the time of wear of the conventional tire. It can be seen from FIG. 4(B) that non-uniform wear occurs on the block tread surface 10 in the conventional tire. The evaluation point was 2.5. FIG. 5(B) shows the sectional shape of the edge of the block at the time of wear in the tire of the present invention. It can be seen from FIG. 5(B) that non-uniform wear hardly occurs on the block tread surface 10 in the tire of the present invention. The evaluation point was 3.5.

EVALUATION METHOD OF NOISE (SOUND PRESSURE LEVEL)

The new tires of the present invention and those of the conventional tires were fitted to the front wheels of an FR car of a domestic make, respectively, and noise was measured by indoor single noise measurement after running 4,000 km at a mean speed of 30 km/h on an ordinary road.

Figure 6A:
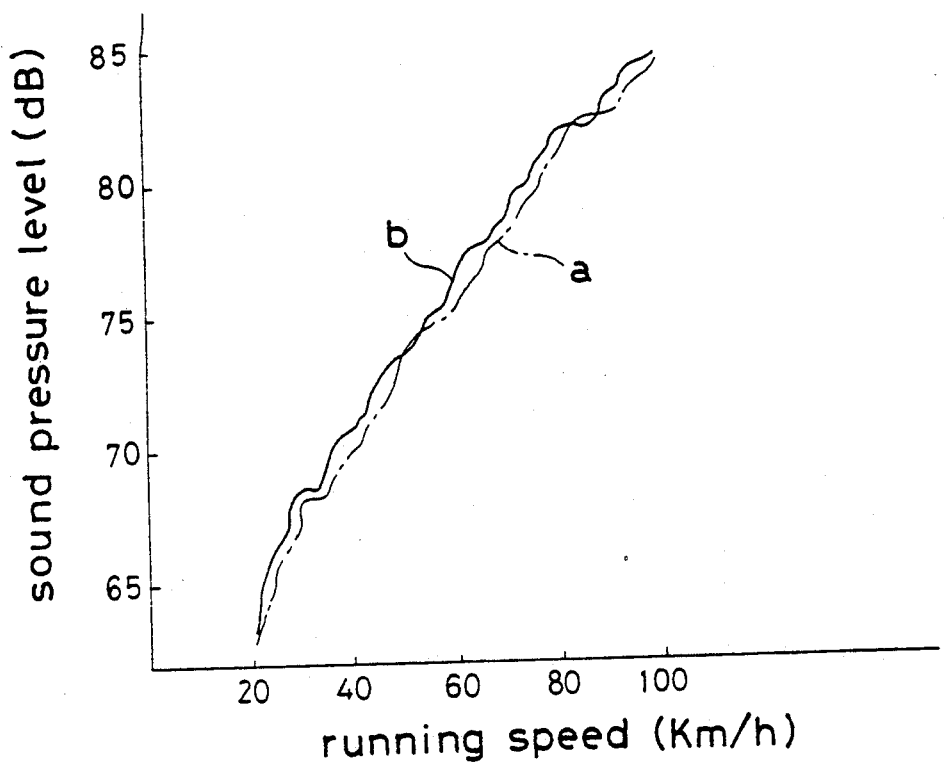
FIG. 6(A) is a diagram showing the relationship between a running speed and a sound pressure level in the case of indoor single noise measurement of the new tire.

FIG. 6(A) shows the relationship between the running speed (km/h) of the new tire and the sound pressure level (dB). In the diagram, symbol a represents the tire of the present invention and b does the conventional tire. As can be seen from FIG. 6(A), the sound pressure level was lower in the tire of the present invention than in the conventional tire at almost all the running speeds.

Figure 6B:
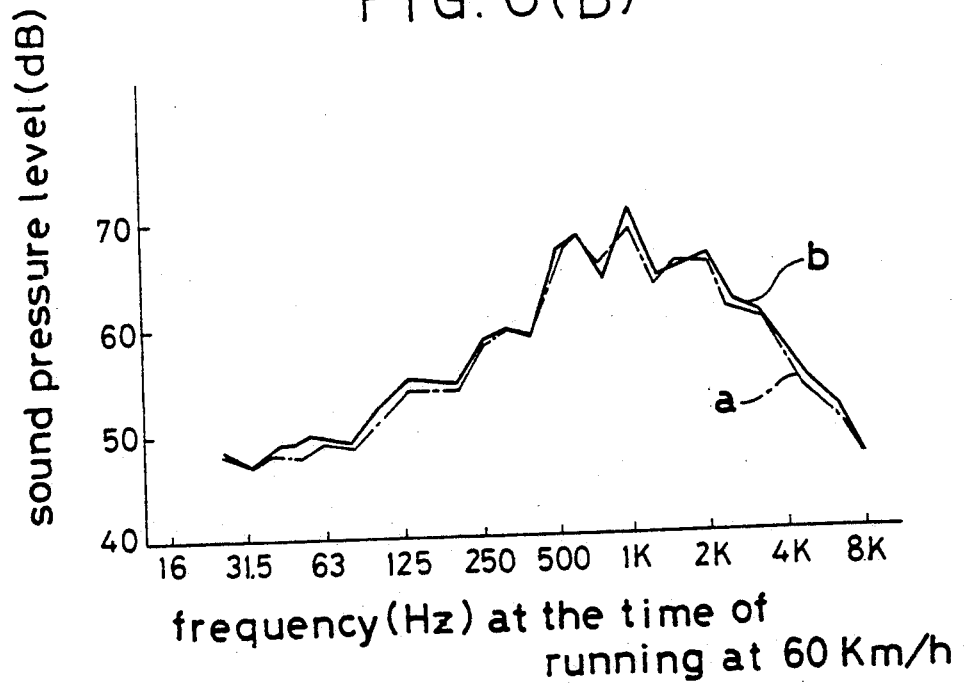
FIG. 6(B) is a diagram showing the relationship between a frequency (Hz) and a sound pressure level (dB) at the time of running at 60 km/h in the case of indoor single noise measurement of the new tire.

FIG. 6(B) shows the relationship between the frequency (Hz) and the sound pressure level (dB) when the new tires were run at 60 km/h. In the diagram, symbol a represents the tire of the present invention and b does the conventional tire. As can be seen from FIG. 6(B), the sound pressure level was lower in the tire of the present invention than in the conventional tire at almost all frequencies.

Figure 7A:
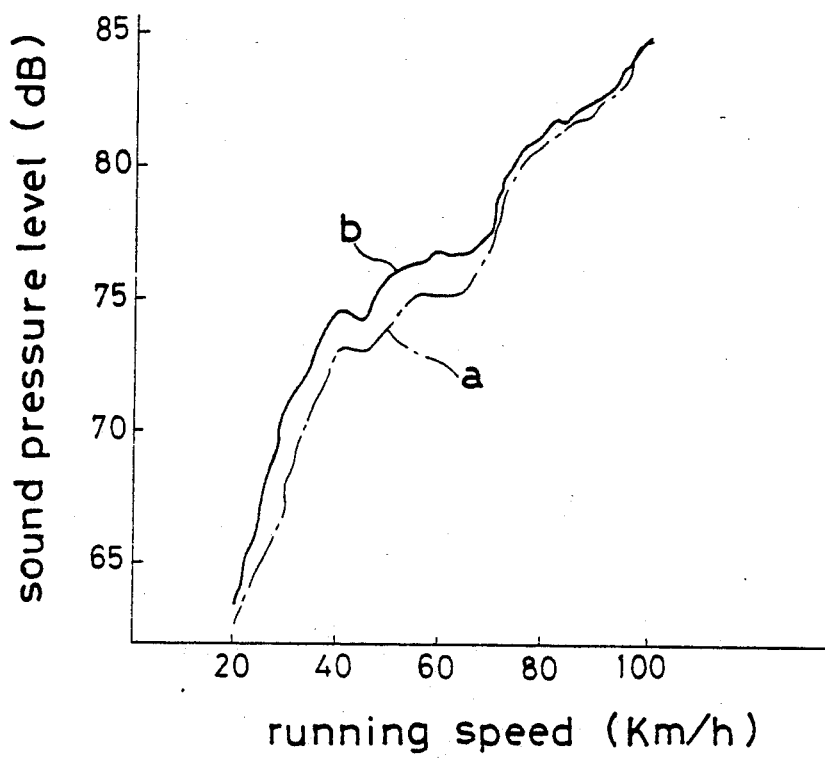
FIG. 7(A) is a diagram showing the relationship between the running speed and the sound pressure level in the case of indoor single noise measurement after running 4,000 km.

FIG. 7(A) shows the relationship between the running speed (km/h) of the tire and the sound pressure level (dB) after running 4,000 km. In the diagram, symbol a represents the tire of the present invention and b does the conventional tire. As can be seen from FIG. 7(A), the sound pressure level was lower in the tire of the present invention than in the conventional tire after running 4,000 km at almost all the running speeds.

Figure 7B:
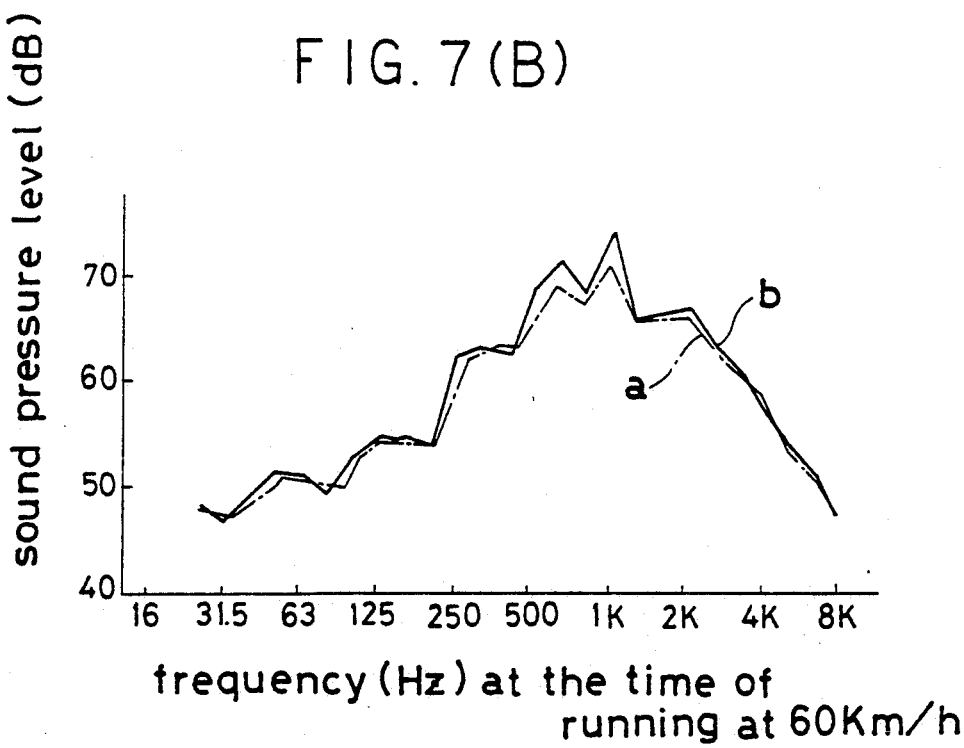
FIG. 7(B) is a diagram showing the relationship between the frequency (Hz) and the sound pressure level (dB) at the time of running at 60 km/h in the case of indoor single noise measurement after running 4,000 km.

FIG. 7(B) shows the relationship between the frequency (Hz) and the sound pressure level (dB) of the tire at the time of the running speed of 60 km/h after running 4,000 km. In the diagram, symbol a represents the tire of the present invention and b does the conventional tire. As can be seen from FIG. 7(B), the sound pressure level was lower in the tire of the present invention than in the conventional tire at almost all the frequencies even after running 4,000 km.

As described above, in the tire of the present invention, the edge of the block formed on the tire tread surface is chamfered to the curve surface connecting to the block tread surface in the curve form. Accordingly, non-uniform wear and noise at the time of running can be reduced.

What is claimed is:

1. A pneumatic tire having a tread pattern consisting of blocks which are defined by main grooves disposed on a tire tread surface in a tire circumferential direction and by sub-grooves dispose don the tire tread surface in a tire transverse direction, wherein the improvement comprises: each edge of each of said blocks defined by said main grooves and said sub-grooves crossing one another at an acute angle is chamfered and a curved surface at an upper end of said chamfer connects said chamfer to a block tread surface in a curve form as viewed in a vertical cross-section of each respective block, wherein the radius of curvature of said curved surface is at least 1 mm.

2. A pneumatic tire according to claim 1, wherein the radius of curvature of said curved surface is from 2 mm to 15 mm.

3. A pneumatic passenger car tire having a tread pattern consisting of blocks which are defined by main grooves disposed on a tire tread surface in a tire circumferential direction and by sub-grooves disposed on the tire tread surface in a tire transverse direction, wherein the improvement comprises: each edge of each of said blocks defined by said main grooves and said sub-grooves crossing one another at an acute angle is chamfered and a curved surface at an upper end of said chamfer connects said chamfer to a block tread surface in a curve form as viewed in a vertical cross-section of each respective block, wherein the radius of curvature of said curved surface is at least 1 mm.

* * * * *